March 19, 1963
R. J. SCHULSTAD
3,081,543
TOOTH BANDING MECHANISM
Filed June 20, 1960
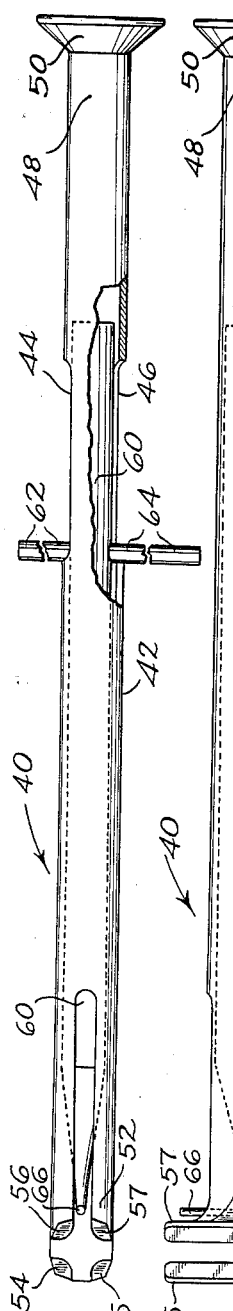
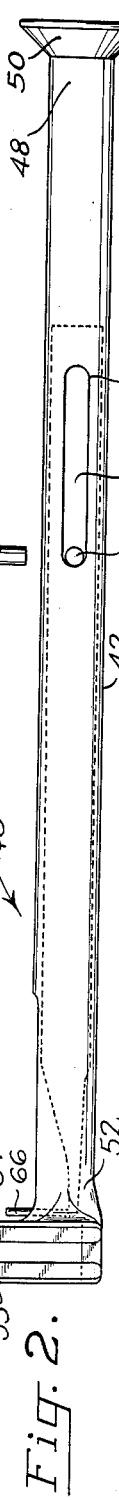
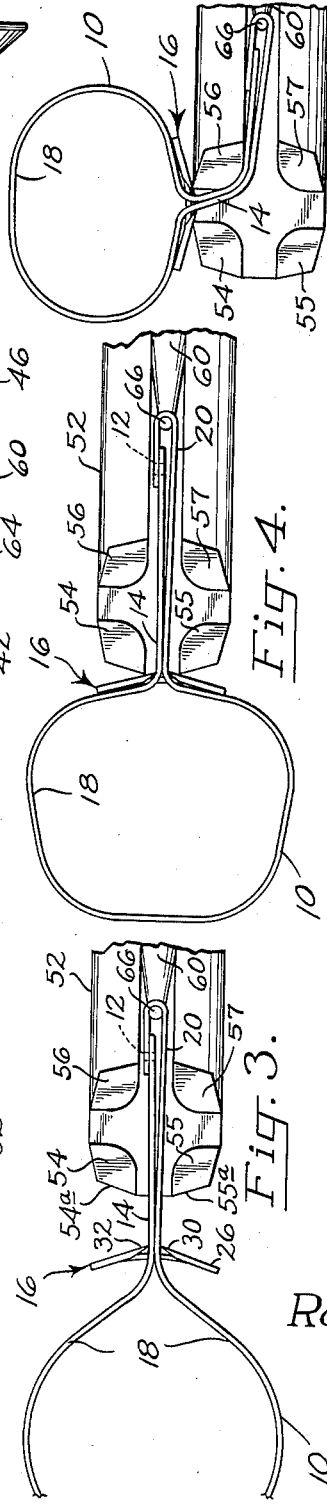
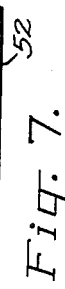
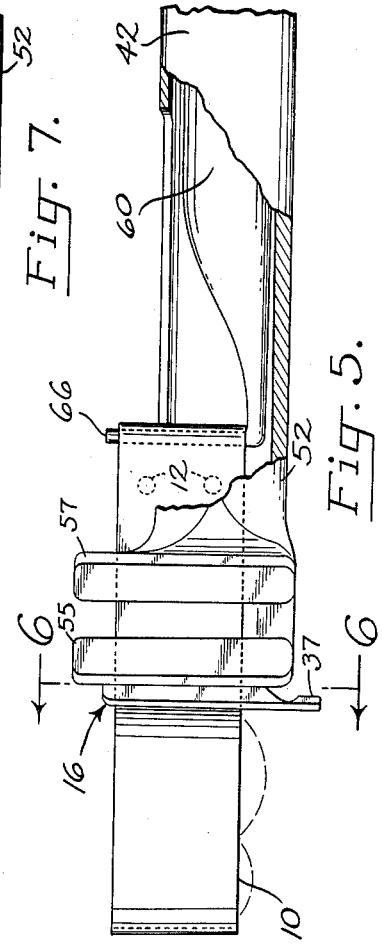
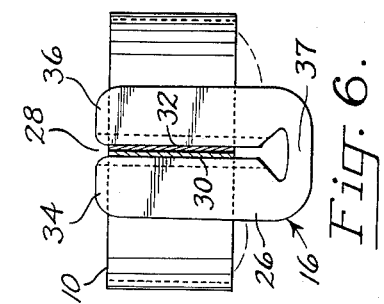
Robert J. Schulstad
INVENTOR.
BY Ramsey and Kolisch
Attys.

United States Patent Office 3,081,543
Patented Mar. 19, 1963

3,081,543
TOOTH BANDING MECHANISM
Robert J. Schulstad, 5570 SW. Arrowwood Lane,
Portland, Oreg.
Filed June 20, 1960, Ser. No. 37,330
4 Claims. (Cl. 32—63)

This invention relates to mechanism for banding a tooth, and more particularly to a novel tooth band and means for tightening the band around the tooth and then holding it in its tightened condition.

A general object of the invention is to provide an improved adjustable band for a tooth.

Another general object is to provide improved means for holding a band tightly about a tooth.

A still further object is to provide improved mechanism for tightening a band about a tooth.

Bands are applied to teeth for various purposes, but a common one is for the application of filling material, such as amalgam, into a suitable cavity preparation. In this instance, the band acts as a matrix, and the inside of the band forms some of the contour of the finished filling. While the band of the invention has particular utility as a matrix, it should be understood that the invention is useful in any application where it is desired to place a band about a tooth and tighten the same.

The band and tightening mechanism are free of a number of objectionable features common to presently known types of bands. For instance, the band is suitable without modification for use with a wide range of tooth sizes. When adjusted in size and then clamped in place the band continues to bind the tooth securely, even when outward pressure is exerted thereon. The mechanism used for tightening the band about a tooth is actuated digitally, eliminating the need for gross hand manipulations by the dentist.

Once the mechanism for placing the band around the tooth has been used, the mechanism may be removed from the mouth leaving its band in clamping relation. This permits placement of additional bands without interfering with each other.

Further objects and advantages are attained by the invention, which is described hereinbelow in conjunction with the accompanying drawings, wherein:

FIG. 1 is a view illustrating a digitally operated, band-tightening mechanism according to this invention;

FIG. 2 is a side view of the band-tightening mechanism in FIG. 1;

FIG. 3 is a view, slightly enlarged, of one end of the tgihtening mechanism of FIGS. 1 and 2, with a band as contemplated by this invention within the mechanism, and a clamp member fitted over an intermediate portion of the band pinching its sides together;

FIG. 4 is a view of the tightening mechanism and band in FIG. 3, showing the band as it looks when it is tightened about a tooth;

FIG. 5 is a side view of the band and tightening mechanism illustrated in FIG. 4;

FIG. 6 is a section view taken along the lines 6—6 in FIG. 5, and illustrating details of the clamp member; and FIG. 7 shows the band-tightening mechanism with a band placed in another position therein.

Referring now to the drawings, a continuous band or banding member according to this invention is indicated at 10. In the form of the invention shown, the band comprises an elongated, relatively narrow strip of flexible material with its ends joined, as by spot welds 12. The strip of flexible material in the usual instance comprises a strip of thin metal sheet, such a strip having requisite strength while conforming readily to the profile of a tooth when it is tightened thereabout.

As can be seen in FIGS. 3 and 4, side portions of the band intermediate its ends are drawn or pinched together, thus to provide a constricted portion 14 in the band. Fitted about this constricted portion is a clamp member 16, constructed to hold the constriction of the band. With the clamp member fitted in place on the band, the sides of the band extend in bends that define a pair of loops 18, 20 on either side of the clamp member. The larger of the two loops 18 is adapted to be placed about a tooth. The smaller of the loops 20 provides a means for holding or fastening onto the band, during the time that it is being tightened about a tooth.

With reference now specifically to clamp member 16, this comprises a realtively thin, curved plate of sheet material 26. In operative position on a tooth, the plate has a concave face facing the tooth (the position of such a tooth being indicated in dashed outline in the figures) and a convex side facing away from the tooth. Extending downwardly from the top margin of the plate in FIGS. 5 and 6 and transversely of the curvature of the plate (i.e., paralleling the axis of curvature) is a slot 28, defined by edges 30, 32. These are underbeveled with respect to the convex face of the plate, as best illustrated in FIG. 3. The slot in the plate divides the plate into a pair of leg portions 34, 36 joined at one set of ends by a web of material 37, and unjoined at their other set of ends. The slot constitutes a constricting means in the clamp member.

Plate 26 is made of flexible and resilient material, preferably of metal. Since the top set of ends of legs 34, 36 are unjoined, the clamp member may be mounted in position about intermediate portion 14 of the band by sliding it laterally over the sides of the band. When the band is slipped between edges 30, 32, the legs spread to receive the band, and at the same time edges 30, 32 bite into the outside surfaces of the band. The under-bevel of the edges sharpens the edges enabling them to bite better into the band. With reference to FIG. 3, note that edges 30, 32 protrude outwardly from the convex face of the plate 26 when the clamp member is in a relaxed state. When a band is tightened about a tooth, the plate is flattened somewhat by the mechanism used to produce tightening, and its natural tendency to return to its concavo-convex shape when the tightening mechanism is removed produces a pulling action on the band that aids in keeping the band tightened about a tooth.

Considering now the mechanism contemplated for tightening the band on a tooth, the mechanism is best illustrated in FIGS. 1 and 2, and is indicated generally at 40. As illustrated in FIGS. 1 and 2, mechanism 40 comprises an elongated mounting 42 in the form of a hollow tube. Adjacent an end 48 of the tube are aligned slots 44, 46. A circular, somewhat dished thumb seat 50 is affixed to end 48. An end 52 of the tube opposite end 48 has parallel fingers 54, 55, 56, and 57 projecting out to one side of the tube and integral with the tube. Fingers 54, 55 constitute one pair, and fingers 56, 57 constitute another pair disposed behind the first pair. The fingers of one pair are aligned with the fingers of the other pair longitudinally of mounting 42, and the fingers of each pair are aligned with each other transversely of the mounting. The fingers act as guides for a band during its tightening, as will be explained below. When the mechanism 40 is used to tighten a band, two of the fingers abut legs 34, 36 and exert pressure thereon. In FIGS. 3 and 4 it is fingers 54, 55 that contact the clamp member. In FIG. 7, fingers 54, 56 are so used. In a similar manner, fingers 55, 57 can be used for contacting the clamp member. The fingers have faces for contacting the clamp member that recede slightly from a plane perpendicular to the band that is being tightened. Considering the organization shown in FIG. 3, faces 54a, 55a recede in this manner (in a preferred embodiment about 15°). Thus, forces exerted on a clamp member by a pair of fingers are localized to areas directly adjacent edges 30, 32.

Mounted within the hollow center of mounting 42 is an elongated rod 60. The rod has finger-gripping studs 62, 64 connected thereto and extending out through slots 44, 46. Integral with the left end of the rod in FIGS. 1 and 2 is a pin 66 substantially parallel to fingers 54—57. The pin is aligned with the spaces between the front pair of fingers 54, 55 and the rear pair of fingers 56, 57. The rod together with the pin is shifted rearwardly from the position shown in FIGS. 1 and 2 by pulling gripping studs 62, 64 to the right in FIGS. 1 and 2.

Explaining the operation of the band and tightening mechanism, a dentist first slips a clamp member 16 in position over an intermediate portion of the band, far enough away from one end of the band to make loop 18 sufficiently large to surround easily the tooth being treated. The smaller loop is then fitted over rod 66, with the constricted portion of the loop to the right of clamp member 16. Said loop is slipped between legs 54 and 55 of band-tightening mechanism 40. The dentist may then place his thumb on thumb seat 50, and his middle and forefinger on finger gripping studs 62 and 64. When these fingers are drawn toward the thumb, pin 66 shifts to the right as shown in FIGS. 3 and 4, and fingers 54 toward the left with respect to loop 18, which results in the loop being drawn through slot 28. This holds the clamp and band together so that the band and clamp can be carried to the mouth with the larger portion of the band on the left side of clamp 66. This can be placed around the tooth. Further digital pressure between seat 50 and studs 62 and 64 produces tightening of the loop about a tooth. While the band may be shifted relatively easily to the right of the clamp member, edges 30, 32 inhibit shifting in the opposite direction. After the loop is tightened, the tightening mechanism may be removed, and an tendency for the loop to loosen itself about the tooth is prevented by edges 30, 32 biting into the outer sides of the band. With the tightening mechanism 40 removed, the mouth is relatively uncluttered, and the dentist may proceed to fill the tooth, or to place additional bands on other teeth in order to fill several teeth simultaneously.

In some instances, as when treating teeth toward the rear of the mouth, fingers 55, 56 may be used to exert pressure on the clamp member, as illustrated in FIG. 7. Fingers 55, 57 may be used in the same manner. In both these instances, the constricted portion of the band is bent around so as to place loop 18 in position to be fitted over pin 66. The rounded inner corners of the fingers enables the band to slide easily thereover.

Regardless of how the band and tightening mechanism are used, it will be noted that a band tightly clamped about a tooth is possible. In producing the tightening, digital thumb pressure is used, and gross manipulations of the hand are unnecessary. One size of band will fit many sizes of teeth. The lock provided by the clamp member assures a tight, snug fit at all times until the band is removed.

It is claimed and desired to secure by Letters Patent:

1. In banding mechanism for a tooth, a clamp member for holding a band member tightly about a tooth comprising a curved plate of flexible and resilient material having convex and concave faces, and a pair of substantially parallel edges provided in the plate defining an elongated slot extending inwardly from one margin of the plate and transversely of the curvature of the plate, said edges constituting constricting means for holding together opposed side portions of the band, said edges being underbeveled with respect to the convex face of said plate.

2. Banding mechanism for a tooth comprising the combination of a banding member in the form of a flat narrow strip of flexible material forming a pair of loops on either side of a constricted portion, and a shiftable clamp member fitted about said constricted portion, said clamp member comprising a curved plate with convex and concave faces of flexible resilient material having an elongated slot extending inwardly from one of its margins and transversely of the curvature of the plate, said clamp member being fitted about said constricted portion with the latter inside said slot and with the concave face of the plate facing one of said loops, said slot constituting a constricting means forcing constriction of said one loop when the same is drawn therethrough.

3. Banding mechanism for a tooth comprising the combination of a banding member having a loop at one end adapted to fit about a tooth and an anchoring portion at the other end thereof, and a shiftable clamp member fitted about an intermediate portion of said banding member, said clamp member comprising a plate disposed transversely of said banding member, and a pair of substantially parallel edges provided in said plate defining an elongated slot extending transversely of said plate and inwardly from one margin thereof with said slot snugly receiving said intermediate portion of said banding member.

4. In banding mechanism for a tooth, a clamp member for holding a band tightly about a tooth comprising a curved plate of flexible and resilient material having convex and concave sides, a pair of substantially parallel edges provided in said plate defining an elongated slot extending inwardly from one margin of the plate and transversely of the curvature of the plate, said edges constituting constringent means for holding together opposed side portions of the band, said edges being underbeveled with respect to the convex side of said plate, and means defining an opening at the base of said slot extending transversely of said slot.

References Cited in the file of this patent

UNITED STATES PATENTS

| | | |
|---|---|---|
| 713,041 | Townsend | Nov. 4, 1902 |
| 980,529 | Ivory | Jan. 3, 1911 |
| 983,844 | Shannon | Feb. 7, 1911 |
| 2,502,903 | Tofflemier | Apr. 4, 1950 |
| 2,521,467 | Lewis | Sept. 5, 1950 |
| 2,575,800 | Eicher | Nov. 20, 1951 |